United States Patent
Tajan et al.

(10) Patent No.: US 10,036,262 B2
(45) Date of Patent: Jul. 31, 2018

(54) TURBOMACHINE IMPELLOR ROTOR WITH DEVICE FOR FEATHERING THE BLADES OF THE IMPELLOR

(71) Applicant: SNECMA, Paris (FR)

(72) Inventors: Sébastien Emile Philippe Tajan, Moissy-Cramayel (FR); Adrien Jacques Philippe Fabre, Moissy-Cramayel (FR); Christophe Jacquemard, Moissy-Cramayel (FR)

(73) Assignee: SNECMA, Paris (FR)

( * ) Notice: Subject to any disclaimer, the term of this patent is extended or adjusted under 35 U.S.C. 154(b) by 192 days.

(21) Appl. No.: 14/911,172

(22) PCT Filed: Aug. 14, 2014

(86) PCT No.: PCT/FR2014/052095
§ 371 (c)(1),
(2) Date: Feb. 9, 2016

(87) PCT Pub. No.: WO2015/022474
PCT Pub. Date: Feb. 19, 2015

(65) Prior Publication Data
US 2016/0186584 A1    Jun. 30, 2016

(30) Foreign Application Priority Data

Aug. 14, 2013    (FR) .................................... 13 58030

(51) Int. Cl.
*F01D 7/02*    (2006.01)
*B64C 11/32*    (2006.01)
*B64C 11/34*    (2006.01)

(52) U.S. Cl.
CPC .............. *F01D 7/02* (2013.01); *B64C 11/325* (2013.01); *B64C 11/346* (2013.01); *Y02T 50/66* (2013.01)

(58) Field of Classification Search
CPC ....... F01D 7/02; B64C 11/325; B64C 11/346; Y02T 50/66
See application file for complete search history.

(56) References Cited

U.S. PATENT DOCUMENTS 235,334 A    12/1880    Bell
3,912,418 A * 10/1975    Andrews ................ B64C 11/30
                                                    416/146 A
(Continued)

FOREIGN PATENT DOCUMENTS

FR    2 964 942 A1    3/2012
GB    124935 A    4/1919
GB    2 218 747 A    11/1989

OTHER PUBLICATIONS

International Search Report dated Dec. 22, 2014, issued in corresponding International Application No. PCT/FR2014/052095, filed Aug. 14, 2014, 2 pages.
(Continued)

*Primary Examiner* — Igor Kershteyn
(74) *Attorney, Agent, or Firm* — Christensen O'Connor Johnson Kindness PLLC

(57) ABSTRACT

The present invention relates to a rotor for a turbomotor impeller, with variable-pitch blades, comprising blade roots capable of rotating in a blade supporting structure and a device for feathering the blades. Said feathering device comprises at least one flyweight secured to a crank connected by a gear set to at least one of said blade roots.

10 Claims, 3 Drawing Sheets

(56) References Cited

U.S. PATENT DOCUMENTS

| | | | | | |
|---|---|---|---|---|---|
| 4,913,623 | A | * | 4/1990 | Schilling | B64C 11/346 |
| | | | | | 416/129 |
| 5,152,668 | A | * | 10/1992 | Bulman | B64C 11/32 |
| | | | | | 416/129 |
| 5,154,372 | A | * | 10/1992 | Hora | F01D 1/24 |
| | | | | | 244/62 |
| 8,932,018 | B2 | * | 1/2015 | Gallet | B64C 11/325 |
| | | | | | 416/153 |
| 8,955,409 | B2 | * | 2/2015 | Carvalho | B64C 11/008 |
| | | | | | 416/145 |

OTHER PUBLICATIONS

Written Opinion of the International Searching Authority, issued in corresponding International Application No. PCT/FR2014/052095, filed Aug. 14, 2014, 5 pages.

Written Opinion of the International Searching Authority dated Dec. 22, 2014, issued in corresponding International Application No. PCT/FR2014/052095, filed Aug. 14, 2014, 6 pages.

International Preliminary Report on Patentability dated Feb. 16, 2016, issued in corresponding International Application No. PCT/FR2014/052095, filed Aug. 14, 2014, 1 page.

* cited by examiner

TURBOMACHINE IMPELLOR ROTOR WITH DEVICE FOR FEATHERING THE BLADES OF THE IMPELLOR

TECHNICAL FIELD

Embodiments of the present disclosure relate to the field of aeronautical turbine engines, and more particularly that of turboshaft engines having unducted propellers, known as "open-rotor" engines or fast-propeller engines, and to the field of devices for controlling the orientation of the blades of the propellers.

BACKGROUND

Aeronautical engine technology is developing rapidly, and one of the avenues explored for improving the specific consumption of civil airplane engines is currently that of developing open-rotor engines. Engines of this kind, such as that described in the patent application FR 2 941 493 by the applicant company, comprise a conventional turboshaft engine gas generator, one or more turbine stages of which drive an unducted fan which extends outside the engine. For reasons of the thrust level to be reached and of reducing the noise generated by the blades, the engine generally comprises two contra-rotating unducted propellers, i.e. propellers which rotate in opposite directions and which can be positioned at the front or at the rear of the engine, according to the configuration selected, for example in order to position the propellers as far as possible from the passenger cabin.

The general configuration of an open-rotor engine is shown in FIG. 1.

As in the case of conventional turboprop engines, the propeller blades of the open-rotor engines have a variable pitch, i.e. the pitch of these propellers can be modified during flight in order to change the thrust of the engine and optimize the output of the propeller in accordance with the speed of the aircraft. A number of devices have been conceived in order to vary the pitch of the blades, which devices generally comprise setting the vane into rotation about the main axis thereof by means of conical pinions located below the root of the vane. The pinions engage with conical pinions of a control system.

In normal use, during flight phases, the pitch of a propeller changes between two limit boundaries which correspond to a low-pitch position at low travel speeds, which is of approximately 30° relative to the plane of rotation of the propellers, and a high-pitch position at high speeds, which is of approximately 65° relative to this same plane of rotation of the propellers. The feathered position corresponds to a pitch which is greater than that of the high-pitch position and is equal to approximately 90°. The pitches in these normal use conditions are conventionally known as positive.

One of the limitations of systems for controlling the pitch of propeller blades is having to bring the blades into the position known as "feathered" in the event of the pitching system failing. The feathered position consists in rotating the propeller blades until the chord thereof is substantially aligned into the wind, thus reducing the drag generated by the blades and, consequently, the yaw imbalance produced on the airplane. Another intention is to reduce the residual rotational speed of the propellers.

The feathered position must correspond to a position of equilibrium which is automatically assumed by the propeller blades when the system for controlling the pitch no longer transmits any torque.

Conventionally, the return to the feathered position is ensured by what are known as direct counterweights, the inertia of which, being far greater than that of the blades, should ensure that the blades are returned to the feathered position defined above.

According to another solution described in the patent application WO 2012/066240, filed by the applicant, balance weights which form counterweights are attached to the conical pinions of the system for controlling the pitch of the blades and are arranged having an overhang relative thereto. The system is integrated in the spaces between the blades in order to have a minimal axial and/or radial size. In normal operation, the blades are held in position by means of the control system. In the event of the system failing, the action of the centrifugal force due to the rotation of the propeller brings the blades towards a rest position which corresponds to the feathered position of the blade. According to the embodiment mentioned in this application, the conical pinion of the blade root causes a reduction ratio of approximately 2 (two) between the pitch angle of the counterweight and the pitch angle of the blade. Other embodiments relating to devices for feathering blades of a propeller, comprising balance weights which drive a pinion that is rigidly connected to the root of the blades, are described in GB 2 218 747, FR 2 864 942, GB 124 935 or U.S. Pat. No. 2,353,334.

These two embodiments each have a disadvantage. The solution comprising a counterweight which is positioned directly on the axis of rotation is disadvantageous in terms of weight, because it requires the use of a heavy balance weight, the effect of which is not multiplied. The solution comprising a balance weight which meshes directly with the conical pinion for controlling the rotation of the blade makes it possible to reduce the weight used on account of the multiplication, but the freedom of choice is still limited due to restrictions relating to the size of the device relative to the space available. These limitations may prevent integration in the plane of the propeller.

SUMMARY

A rotor for a turboshaft engine propeller is disclosed, having variable-pitch blades, comprising blade roots which can be rotated in a structure supporting the blades, a toothed wheel being rigidly connected to the root of the blades, and a device for feathering the blades being capable of setting the root of the blades into rotation via the toothed wheel, wherein the feathering device comprises at least one balance weight which is rigidly connected to a crank which is connected by means of a gear train to at least one of the blade roots.

Using a gear train between the balance weight that is mounted on a crank makes possible, in an effective manner, considerable adaptability to the geometric constraints of the rotor, there in particular being a greater choice than in the prior art for multiplication of the transmission of forces between the balance weight and the root of the blades. This choice permits a significant reduction in the weight of the device.

In some embodiments, the balance weight is arranged outside the plane of rotation of the rotor. In this way, the device is not restricted by the space available for the displacement thereof. Preferably, the crank is set into rotation by the balance weight about an axis parallel to the axis of rotation of the rotor.

In addition, a reduction in the impact of vibrations is achieved by a gear train comprising a play take-up means.

According to a first embodiment, the play take-up means comprises a wheel having teeth comprising flexible elements which ensure continuous inter-tooth contact.

According to another embodiment, the play take-up means comprises a double play-take-up gear unit. In particular, the double play-take-up gear unit comprises two pinions which are connected by a spindle.

According to an advantageous use, the rotor comprising a toothed wheel which is connected to a blade root, the double play-take-up gear unit is in the same plane as the toothed wheel connected to the blade root, the plane being perpendicular to the blade root.

In accordance with a further feature making possible a compact assembly of the feathering device, the double play-take-up gear unit is rigidly connected to a first angular contact pinion which engages with a second angular contact pinion connected to the crank.

In some embodiments, the second angular contact pinion connected to the crank is rigidly connected to a coaxial pinion which engages with the crank.

The feathering device can be associated with one or more blade roots. Preferably, the feathering device is associated with each of the blade roots.

Finally, the present disclosure also relates to a propeller comprising the rotor having the above features and the blades arranged in the blade roots.

BRIEF DESCRIPTION OF THE FIGURES

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
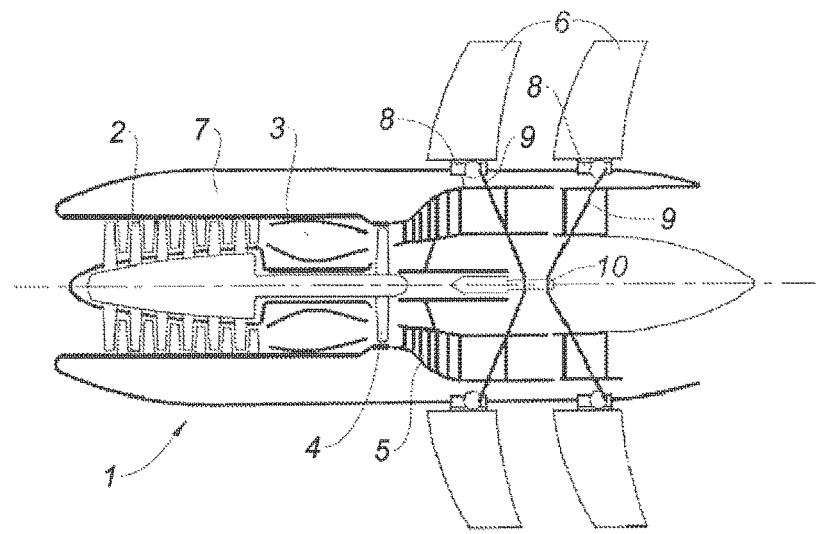
FIG. 1 is a schematic sectional view of a fast-propeller turboshaft engine.

With reference to FIG. 1, a fast-propeller turboshaft engine 1 is shown, comprising a gas turbine engine which forms a gas generator comprising, among other components, a compressor 2, a combustion chamber 3 and a turbine 4 which drives the compressor 2, and also a free turbine 5 located downstream of the connected power turbine 4, which drives two series of contra-rotating propeller blades 6. The propellers are positioned outside the casing 7 of the gas generator and the blades thereof are held by a vane root 8 which can be rotated about an axis which is radial with respect to that of the turbine engine 1. This axis passes through the center of the vane root and forms the main axis of the blade. The rotation of the blade about the axis thereof is ensured by an actuator, for example in the form of a rod 9, which acts on a pair of conical pinions, one of which is fixed to the vane and surrounds the vane root 8. A regulation system 10 controls, via the rods 9, the angular position of the blades of each of the propellers 6 and ensures that the blades are set into rotation in a synchronized manner.

The disclosure is not restricted to a use on this type of engine. This engine is described by way of example.

Figure 2:
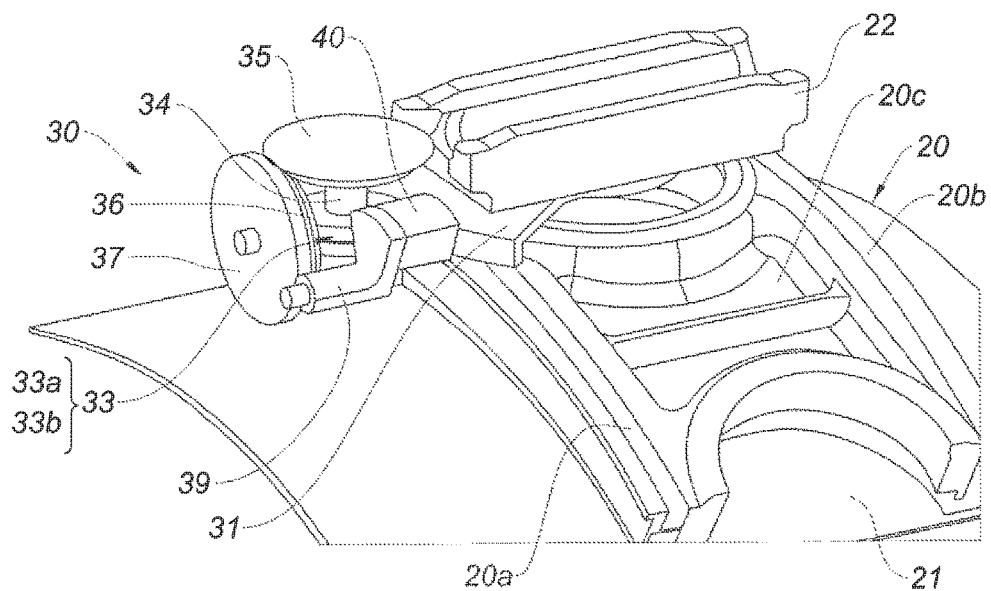
FIG. 2 is a perspective partial view of the ring of the rotor, together with the feathering device according to the invention.
Figure 3:
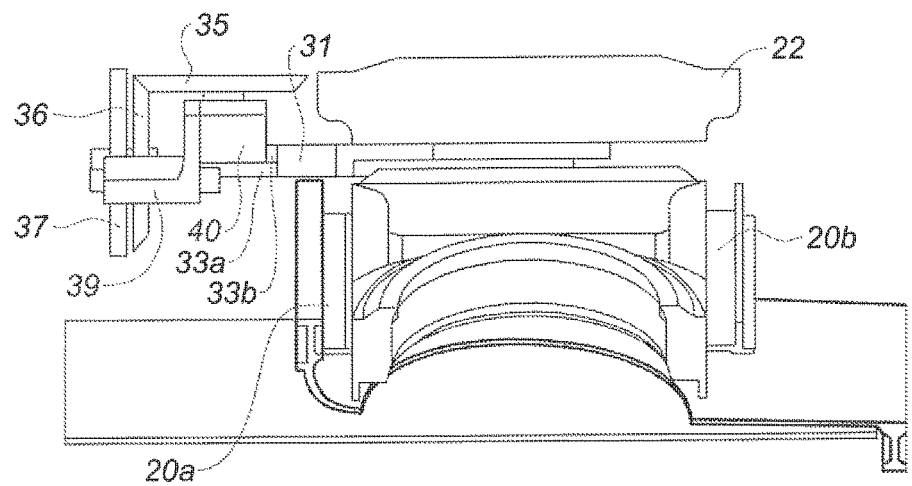
FIG. 3 is a side view of the device shown in FIG. 2.
Figure 4:
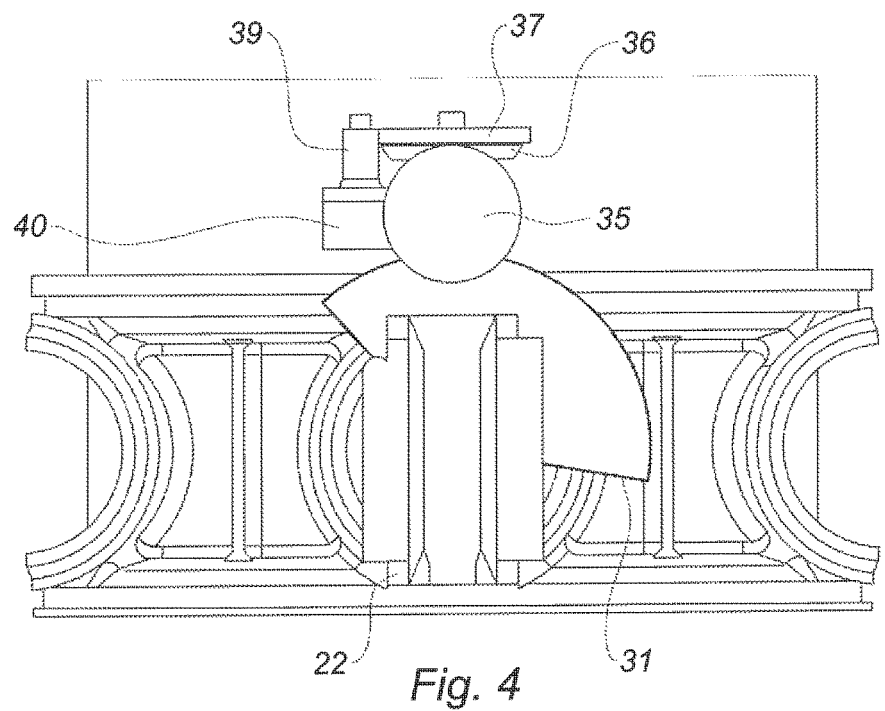
FIG. 4 is a plan view of the device shown in FIG. 2.

FIGS. 2, 3 and 4 are partial views, from three different directions, of a rotor for a propeller of an engine as described above.

A ring 20 is shown, which has an axis which corresponds to that of the engine and has openings 21 which are radial with respect to its axis. An embodiment of the ring is described in the patent FR 2953487, in the name of the applicant. The ring is polygonal in shape, having upstream 20a and downstream 20b structural ring elements which are connected by means of platforms 20c. The openings 21 house the roots of the blades, which are not shown except for the part 22 which forms the recess for mounting a blade. According to this embodiment, the part comprises an axial groove in which the inner radial end of the blade is received. The portion of the root of the blade housed in the opening 21 is not shown either, for reasons of improved clarity. The root is mounted so as to be rotatable about the axis of the opening 21. Suitable bearings are provided for this purpose. The bearings are not shown either.

The feathering device 30 according to the disclosure comprises a toothed wheel 31 which is rigidly connected to the blade root; in this case rigidly connected to the part 22. The wheel is toothed only in a sector having an angle which corresponds to the permitted displacement of the rotating blade root. The toothed wheel 31 is perpendicular to the blade root and to the axis of rotation thereof.

Figure 5:
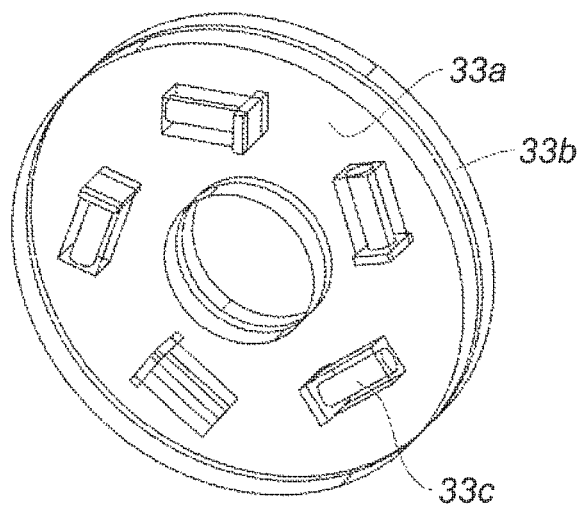
FIG. 5 shows a double play-take-up gear unit.
Figure 6:
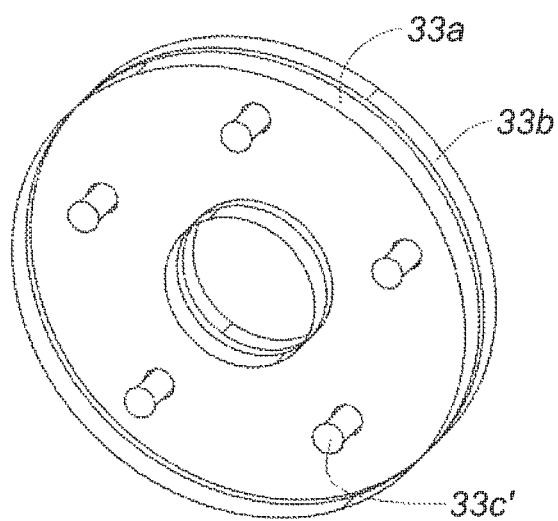
FIG. 6 shows a variant of a double play-take-up gear unit.

A double play-take-up gear unit 33 meshes with the toothed wheel 31. The double gear unit 33 is formed by two toothed pinions 33a and 33b which are placed against one another and are rotatably connected by a resilient means. The teeth of the pinions have a slight angular offset relative to one another. In this way, the teeth of the double gear unit 33 are permanently in contact, at least by the teeth of one of the pinions, with the teeth of the toothed wheel 31. This play take-up prevents vibrations being produced on the pinions of the gear unit. FIGS. 5 and 6 show two non-limiting embodiments of a double play-take-up gear unit of this kind. In FIG. 5, the two toothed pinions 33a and 33b, shown schematically as discs, are connected by springs 33c which operate by compression. In FIG. 6, the two toothed pinions are connected by parts 33c' in the form of studs which operate by bending. Alternatively, the springs 33c can be replaced by flexible and deformable elements which absorb the vibrations.

The two pinions are in the same plane of rotation as that of the toothed wheel 31, or are in a plane which is parallel thereto. The pinions are supported a shaft 34 which is parallel to the axis of rotation of the vane root. One of the pinions 33a or 33b of the double gear unit is rigidly connected to the shaft 34, and the other is rotatable relative thereto within the limits defined by the springs 33c or the equivalents. A first conical pinion 35, which meshes with a second conical pinion 36 having an axis perpendicular to the shaft 34, is mounted on the shaft 34, at a distance from the pinions 33. A toothed wheel 37, with which the shaft of a crank 39 meshes, is mounted on this same shaft. The balance weight 40 is rigidly connected to the crank 39 and is eccentric relative to the axis of rotation of the crank.

When feathering is triggered, in particular because of a failure in the chain for controlling the pitch of the blades, the centrifugal force causes the balance weight 40 to tilt from a first position in which the device is inactive into a second position, and the crank 39 is set into rotation about the axis thereof. This results in rotational movement of the toothed wheel 37 and, consequently, the conical pinions 35 and 36, the double gear unit 33 and the toothed wheel 31, about the respective axes thereof. The movement of the balance weight is thus transmitted to the associated blade root by means of the gear train formed by the assembly of the pinions and toothed wheels, at an appropriate force transmission ratio.

In summary, the solution makes possible better resistance to the centrifugal force by means of reducing the masses resulting from the kinematic chain and the multiplication. The integration of the gear unit counterweights is ensured by installing the counterweights outside the plane of rotation of the propeller, which means that there is little impact from the proximity of the blades or the nacelle. The impact of the vibrations is reduced due to the presence of a play take-up stage in the gear train. This solution permits symmetrical clamping on either side of the center of gravity, with the aim of countering the offset in the installation of the device.

The invention claimed is:

1. Rotor for a variable-pitch blade propeller of a turboshaft engine, comprising:
   blade roots which can be rotated in a structure supporting the blades;
   a toothed wheel being rigidly connected to the root of the blades, and a device configured for feathering the blades that is capable of setting the root of the blades into rotation via the toothed wheel, wherein said feathering device comprises at least one balance weight which is rigidly connected to a crank which is connected via a gear train to at least one of said blade root toothed wheels,
   wherein the gear train comprises at least one play take-up means that includes a double play-take-up gear unit comprising two pinions.

2. Rotor according to claim 1, wherein the balance weight is arranged outside the plane of rotation of the rotor.

3. Rotor according to claim 1, wherein the crank is set into rotation by the balance weight about an axis parallel to the axis of rotation of the rotor.

4. Rotor according to claim 1 wherein the play take-up means comprises a wheel having teeth comprising flexible elements which ensure continuous inter-tooth contact.

5. Rotor according to claim 1, wherein the double play-take-up gear unit is in a plane which is parallel to that of the toothed wheel connected to the blade root, said plane being perpendicular to the axis of rotation of the blade root.

6. Rotor according to claim 1, wherein the double play-take-up gear unit is rigidly connected to a first angular contact pinion which engages with a second angular contact pinion connected to the crank.

7. Rotor according to claim 6, wherein the second angular contact pinion connected to the crank is rigidly connected to a coaxial pinion which engages with the crank.

8. Rotor according to claim 1, comprising a feathering device for each of the blade roots.

9. Propeller comprising the rotor according to claim 1 and the blades arranged in the blade roots.

10. A rotor for a variable-pitch blade propeller, comprising:
    a blade root that can be rotated in a structure supporting the blade;
    a toothed wheel being rigidly connected to the blade root; and
    a feathering device configured to set the blade root into rotation via the toothed wheel, wherein said feathering device comprises at least one balance weight rigidly connected to a crank, the crank being connected via a gear train to the toothed wheel,
    wherein the gear train comprises at least one play take-up stage that includes two pinions.

* * * * *